United States Patent [19]

Keida

[11] Patent Number: 4,880,372

[45] Date of Patent: Nov. 14, 1989

[54] MATERIAL AUTOMATIC FEEDING SYSTEM FOR INJECTION MOLDING MACHINES

[75] Inventor: Yutaka Keida, Tokyo, Japan

[73] Assignee: Sumitomo Heavy Industries, Ltd., Tokyo, Japan

[21] Appl. No.: 183,750

[22] PCT Filed: Jul. 3, 1987

[86] PCT No.: PCT/JP87/00465
§ 371 Date: Mar. 4, 1988
§ 102(e) Date: Mar. 4, 1988

[87] PCT Pub. No.: WO88/00118
PCT Pub. Date: Jan. 14, 1988

[30] Foreign Application Priority Data
Jul. 4, 1986 [JP] Japan .................................. 61-156303

[51] Int. Cl.⁴ .............................................. B29C 45/17
[52] U.S. Cl. ..................................... 425/145; 425/148; 425/253; 425/254; 425/452; 425/DIG. 118
[58] Field of Search ............... 425/135, 145, 148, 253, 425/254, 452, DIG. 118; 104/89, 90, 91, 302; 414/222, 560; 212/160, 161

[56] References Cited

U.S. PATENT DOCUMENTS
4,363,585 12/1982 Keller et al. ..................... 212/161

FOREIGN PATENT DOCUMENTS
56-70926 6/1981 Japan .
57-69026 4/1982 Japan .
61-158410 7/1986 Japan .

Primary Examiner—Jay H. Woo
Assistant Examiner—Timothy W. Heitbrink
Attorney, Agent, or Firm—Burns, Doane, Swecker & Mathis

[57] ABSTRACT

A material feed system provided with a plurality of injection molding machines. A filling station is provided and has a resin tank in which resin material is stored, a container to which the resin material is fed from the resin tank, and a coupling device for coupling the resin tank and the container on demand. A carrier having a clamping mechanism runs along a track which is laid so as to pass over the injection molding machines and the filling station. The coupling device is controlled by a control unit. The control unit also controls the movement of the carrier to thereby transport the container by the use of the clamping mechanism and to feed the resin material from the container to the injection molding machines.

14 Claims, 6 Drawing Sheets

MATERIAL AUTOMATIC FEEDING SYSTEM FOR INJECTION MOLDING MACHINES

TECHNICAL FIELD

The present invention relates to a feeding system which is provided with a plurality of injection molding machines for carrying out a molding operation of plastics and which is for feeding these molding machines with plastics as a raw material.

BACKGROUND TECHNIQUE

Heretofore, a feeding system has been known which is provided with a plurality of injection molding machines and which is for feeding these injection molding machines with a resin material in a batch-type fashion or a continuous fasion.

The following methods (1) through (3) has been heretofore used to feed the resin material to a plurality of the injection molding machines.

(1) An operator manually throws in a resin material from a sack of resin into a hopper at every injection molding machine.

(2) An autoloader or a resin material feeding device is attached to each injection molding machine and feeds a resin material to the injection molding machine. In this case, each of the autoloaders is fed with the resin material by an operator. Thus, the resin material is delivered into each hopper through each autoloader.

(3) A hopper of each injection molding machine is connected to a resin tank by a pipe through which a resin material is transported from the resin tank. In this event, the amount of resin transported from the resin tan is controlled by monitoring an amount of the resin material in the hopper.

However, in the above-mentioned method (1), the operator must manually feed the resin material into the hopper. Furthermore, the operator must continuously monitor the amount of the resin material in the hopper to replenish the resin material therein.

In the method (2), the resin material in the hopper is monitored by the autoloader. However, there remains a problem that the operator must manually feed the resin material to the autoloader.

On the other hand, in the method (3), the resin material is automatically fed from the resin tank to the injection molding machines. Accordingly, the operator can save a lot of labor. However, if there are a large number of injection molding machines and, furthermore, if there are many kinds of resin materials, an extremely large number of pipes must be arranged. This makes it difficult to install the system in a factory.

Accordingly, it is an object of the present invention to provide a material feeding system which is capable of automatically feeding a resin material to injection molding machines and which can readily be installed in a factory.

DISCLOSURE OF THE INVENTION

According to the present invention, there is provided a plurality of injection molding machines and a resin filling station. The resin filling station comprises a resin tank in which a resin material is stored, a container which is fed with the resin material from the resin tank, and coupling means for coupling the resin tank and the container on demand. In addition, a track is laid so as to pass over the above-mentioned filling station and the injection molding machines. A carrier having a clamping mechanism runs along the track. The carrier and the coupling means are controlled by a control unit. In other words, the movement of the carrier and coupling operation by the coupling means are controlled in accordance with commands from the control unit. According to the commands from the control unit, the carrier transports the container by the use of the clamping mechanism to feed the resin material from the container to the injection molding machines.

THE BEST MODE FOR EMBODYING THE INVENTION

Figure 1:
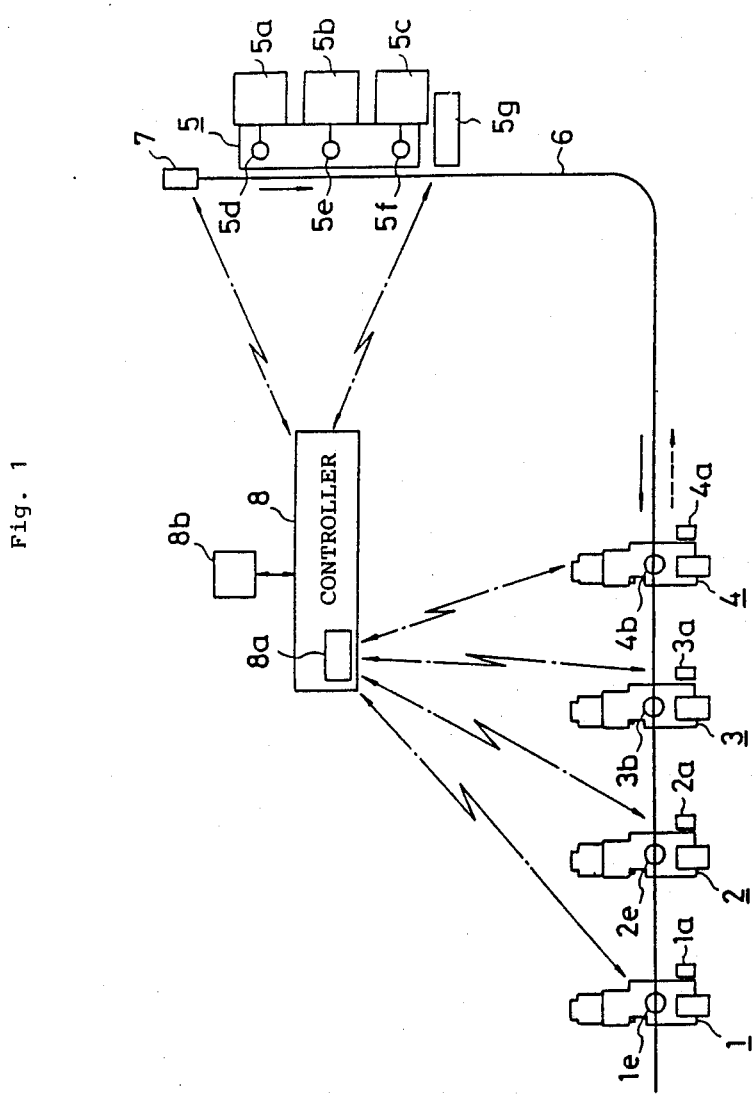
FIG. 1 is a plan view diagrammatically illustrative of an embodiment of a material automatic feeding system according to the present invention.

The present invention will be described with reference to an embodiment shown in the drawing.

At first, referring to FIG. 1, four injection molding machines 1 through 4 are disposed with a predetermined space left therebetween. The injection molding machines comprise control units 1a through 4a, respectively, which individually control injection molding cycles. Each of the control units 1a through 4a comprises an information transmitting/receiving end.

Apart from the above-mentioned injection molding machines 1 through 4 are disposed a filling station 5 which comprises resin tanks 5a, 5b, and 5c and containers 5d, 5e, and 5f corresponding to the resin tanks, respectively. Each container is, for example, a stainless steel case and is provided with a connection opening through which a resin material is fed and discharged as will later be described. The resin tanks are coupled to the containers on demand so as to feed a predetermined amount of the resin material from the resin tanks into the containers of small sizes. A control unit 5g is for the controlling coupling operation between the resin tanks and the containers.

As shown in the figure, a track (a monorail) 6 is laid over the filling station 5 and the injection molding machines 1 through 4. A carrier 7 is disposed on the track 6 and runs along the track 6. The carrier 7 comprises a clamping mechanism for clamping and transporting the containers as will later be described. The carrier 7 is controlled by a controller 8 comprising a transmitting-/receiving end 8a.

Figure 2:
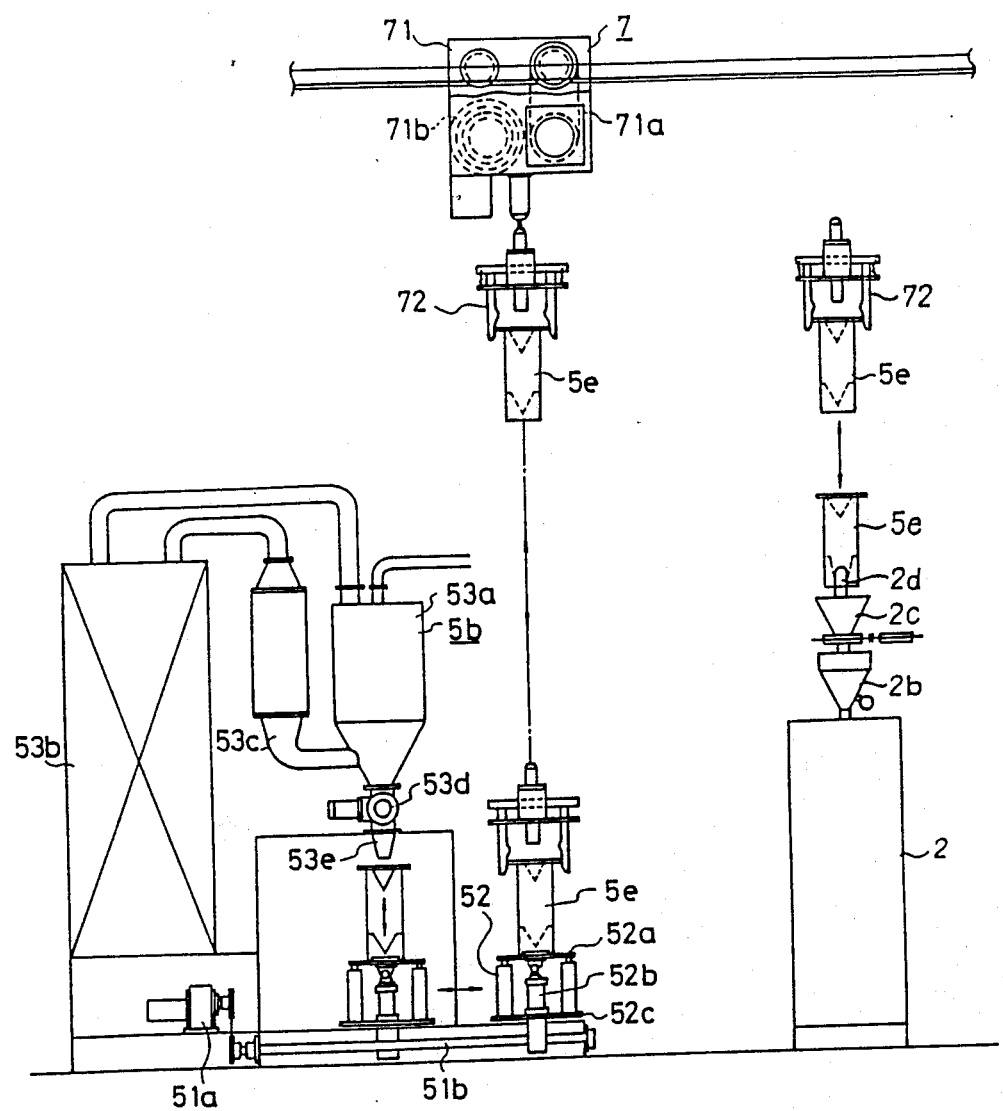
FIG. 2 is an elevational view illustrative of a filling station and a carrier in detail.

Referring to FIG. 2, the container 5e rests on a transport device 52 which is movable by drive of a motor 51a along a direction indicated by an arrow of a broken line. The transport device 52 comprises an up-and-down platform 52a on which the container 5e rests, an up-and-down cylinder 52b for lifting and lowering the up-and-down platform 52a, and a moving platform 52c connected to a screw shaft 51b which is rotated in response to a rotation of the motor 51a. On the other hand, the resin tank 5b comprises a resin tank portion (not shown), a hopper dryer 53a, a dehumidifier 53b, and a heater portion 53c. A lower end of the hopper dryer 53a is provided with a rotary feeder 53d and a chute 53e.

Although not shown in the figure, the containers 5d and 5f also rest on the other transport devices in the similar manner. In addition, the resin tanks 5a and 5c have the same structure as the resin tank 5b.

Figure 3:
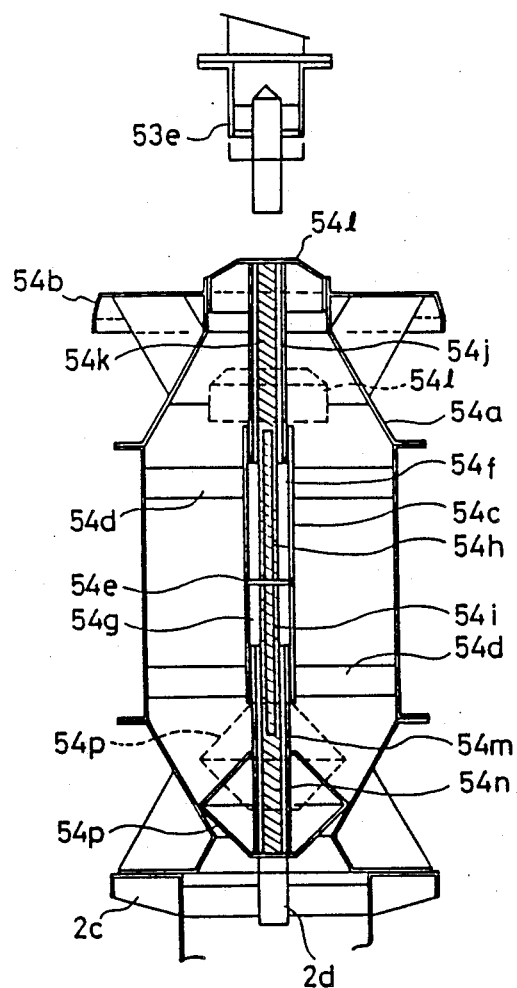
FIG. 3 is a sectional view illustrative of a structure of a container.

A structure of the container will now be described with reference to FIG. 3.

The container has a substantially cylindrical shape with an upper and a bottom end both of which are opened. A periphery of the upper end of a container housing 54a is provided with a supporting portion (a grip portion) 54b which is projected along a radial direction. In the central portion within the container housing 54a is disposed a spring holder 54c of a cylindrical shape extending along an axial direction. The spring holder is supported through supporting units 54d to the container housing 54a. The spring holder 54c is divided therein by a partition board 54e into an upper chamber 54f and a lower chamber 54g. To an upper and a lower surface of the partition board 54e are attached one ends of mandrel members 54h and 54i extending upwards and downwards, respectively.

In a cylindrical supporting axial member 54j is disposed a coil spring 54k extending along the axial direction. The mandrel member 54h is inserted into the coil spring 54k and the supporting axial member 54j. The supporting axial member 54j is disposed in a space between the spring holder 54c and the mandrel member 54h so as to be slidable along the vertical direction. To an upper end of the supporting axial member 54j is attached a sliding plug unit 54l which serves as damper means for opening and closing the upper open end. Upwardly energized by the coil spring 54k, the sliding plug unit 54l closes the upper open end.

Similarly, in a cylindrical supporting axile member 54m is disposed a coil spring 54n extending along the axial direction. The mandrel member 54i is inserted into the coil spring 54n and the supporting axile member 54m. The supporting axile member 54m is disposed in a space between the spring holder 54c and the mandrel member 54i so as to be slidable along the vertical direction. A plug unit 54p is attached to a lower end of the supporting axile member 54m. The plug unit 54p is downwardly energized by the coil spring 54n to close the lower open end.

Figure 4:
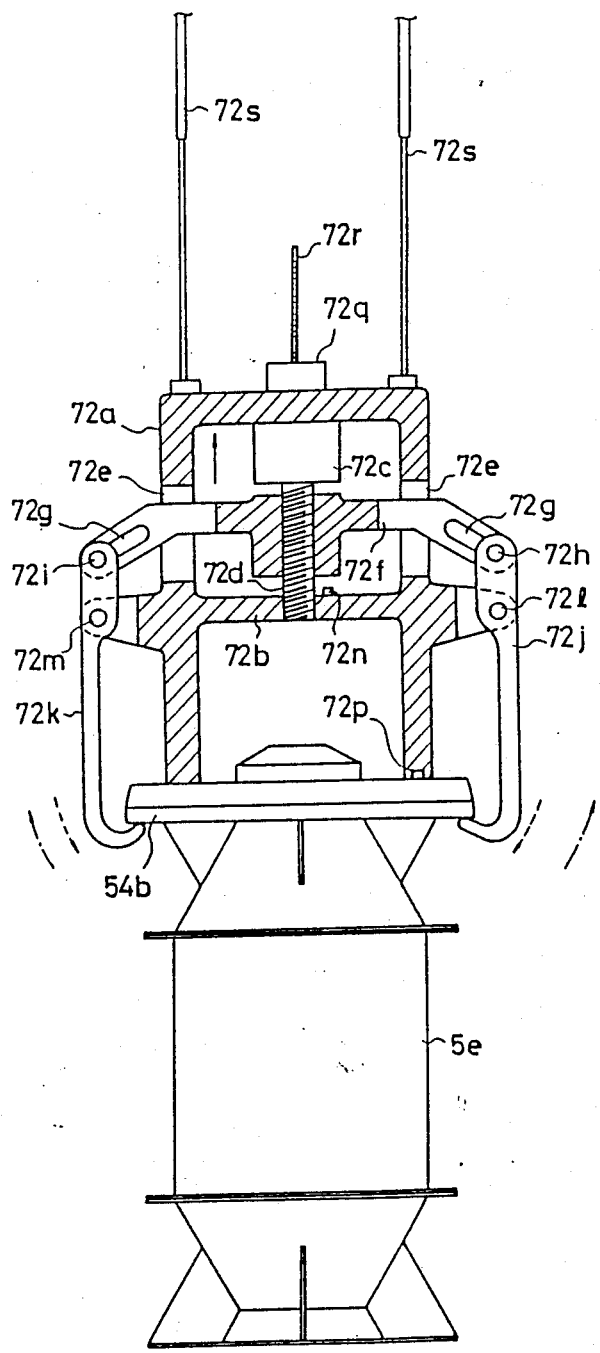
FIG. 4 is a partial sectional view of a clamping mechanism of the carrier in combination with the container.

Referring to FIGS. 2 and 4, the carrier 7 comprises a carrier body 71 and a clamping mechanism 72. The carrier body 71 comprises a control section (not shown) for controlling the movement of the carrier body 71 and operation of the clamping mechanism 72, and a transmitter/receiver (not shown) for receiving commands from the controller 8 and transmitting responses thereto.

Referring to FIG. 4, a structure of the clamping mechanism 72 will be described. A motor 72c is mounted on an inner wall surface of the upper end of a clamping housing 72a comprising a partition wall 72b. A screw shaft 72d extends from the motor 72c and is threaded into the partition wall 72b. The clamping housing 72a has a pair of side surfaces provided with a pair of through hole portions 72e opposite each other, respectively. An arm portion 72f is projected from the through hole 72e and is threaded to the screw shaft 72d. Guide holes 72g are formed at both ends of the arm portion 72f, respectively. Pin units 72h and 72i are disposed in the guide holes 72g, respectively, so as to be slidable within the guide holes 72g. To the pin units 72h and 72i are attached hook portions 72j and 72k, respectively, which extend in a downward direction. The hook portions 72j and 72k are supported by pin units 72l and 72m rotatably fitted on the clamping housing 72a, respectively. A contactless sensor 72n is disposed on the partition wall 72b at a position opposite the arm portion 72f. A contactless sensor 72p is disposed at the lower end of the clamping housing 72a.

The upper end of the clamping housing 72a is connected through a hanger 72q to one end of a supporting wire 72r which is connected at another end thereof to the carrier body 71. A load sensor (not shown) is attached to the other end of the supporting wire 72r. Furthermore, one end of both extensible supporting rods 72s are coupled to an outer surface of the upper end of the clamping housing 72a, while the other ends thereof are coupled to the carrier body 71. The extensible supporting rods 72s are extended and retracted according to the up-and-down movement of the clamping mechanism 72 so as to avoid swing of the clamping mechanism 72.

Now, description will be made as regards feeding operation of the resin material to the injection molding machine with reference to FIGS. 1 through 4.

In the controller 8, positions of the injection molding machines are preliminarily set from a setting unit 8b in correspondence to injection molding machine numbers, respectively, together with positions of the containers placed on the filling station 5 and injection molding conditions of the respective injection molding machines. The resin tanks 5a, 5b, and 5c stores, for example, different kinds of resin materials, respectively (for example, resin materials A, B, and C are stored in the resin tanks 5a, 5b, and 5c, respectively). The controller 8 also preliminarily sets the names of the resins stored in the individual tanks and the names of the resin materials to be fed to individual injection molding machines.

Herein, it is assumed that the control unit 2a of the injection molding machine 2 detects the shortage of the resin material in the hopper 2b. In this event, the injection molding machine 2 once stops the operation and the control unit 2a delivers to the controller 8 a material request signal (Empty signal) accompanied with the injection molding machine number (by the use of a radio wave). Responsive to the Empty signal, the controller 8 calculates from the injection molding machine number a position of the injection molding machine in question and a position of a container which stores a resin material to be fed. When the resin material to be fed is assumed to be B, position information (distance information) for the container 5e and position information (distance information) for the injection molding machine are at first delivered to the carrier 7 together with a start signal.

A control section of the carrier 7 is responsive to the start signal and drives a motor (not shown) mounted on the carrier body 71 to start the movement from a stand-by position along a direction shown by an arrow of a solid line in FIG. 1. The control section calculates a moving distance from the stand-by position with reference to a count number counted by a pulse counter, moves to the container 5e which is present at a position indicated by the controller 8, and stops the motor to stop the movement thereat. Then, the control section informs the controller 8 of completion of the movement. The controller 8 is responsive to the movement completion information and delivers a clamping command to the carrier 7.

The control section of the carrier 7 drives a hoist motor 71a to deliver the support wire 72r from a hoist wheel 71b. As a result, the clamping mechanism 72 is lowered. At this time, the contactless sensor 72n is "ON" (the hook portions 72j and 72k are kept at an open condition). When the clamping mechanism 72 is lowered until the lower end of the clamping housing 72a comes into contact with the upper end portion of the container 5e, the contactless sensor 72p is turned "ON." Thus, the control section of the carrier 7 detects completion of descending operation of the clamping mechanism. The control section drives the motor 72c to rotate the screw shaft 72d and to make the arm portion 72f upwardly move in a direction shown by an arrow of a solid line in FIG. 4. The upward movement of the arm portion 72f moves the pin units 72h and 72i to the right end and the left end of the guide holes 72g, respectively, and makes the hook portions 72j and 72k pivot in a closing direction (a direction shown by an arrow of a broken line) around the pin units 72l and 72m, respectively. To this end, the hook portions 72j and 72k are closed to clamp the grip portion 54b of the container 5e. At this time, the contactless sensor 72n is turned "OFF" so that the control section detects completion of clamping operation.

Next, the control section drives the hoist motor 71a to hoist or wind up the supporting wire 72r to the hoist wheel 71b. On such hoist operation, the same amount as the delivery of the supporting wire 72r is wound up.

On completion of such hoist operation, namely, when the container 5e is hung up by the clamping mechanism 72, the control section of the carrier 7 reports, to the controller 8, completion of clamping or grasping operation. The controller 8 is responsive to a clamp completion signal and delivers a moving command to the carrier 7. The carrier 7 moves to the injection molding machine 2 present at a position indicated by the controller 8 and produces moving completion information. The controller 8 is responsive to the moving completion information and delivers a material feeding command to the carrier 7.

The control section of the carrier 7 drives the hoist motor 71a to lower the clamping mechanism 72. As shown in FIG. 3, a chute 2c is supported on a hopper 2b. In addition, a projection 2d which is projected in an upward direction is supported on the chute 2c (in addition, chutes and projections are likewise supported on hoppers 1b, 3b, and 4b). Accordingly, when the container 5e is lowered by a predetermined distance under control of the control section of the carrier 7, the hoist motor 71a is stopped to stop descending operation of the clamping mechanism 72. At this time, the plug unit 54p is upwardly pushed up by the projection 2d against the energizing force of the coil spring 54n. For example, the plug unit is pushed up to a position shown by a broken line so that the resin material B in the container 5e is fed through the chute 2c into the hopper 2b.

After lapse of a predetermined time interval (a time duration enough to discharge the resin material B in the container 5e), the control section of the carrier 7 hoists or winds up the clamping mechanism 72 by the hoist motor 71a. After completion of the hoist operation, the control section informs the controller 8 of completion of resin material feeding operation. The controller 8 delivers a drive indication to the control unit 2a of the injection molding machine 2 on one hand and delivers a return command to the carrier 7 on the other hand. The carrier 7 moves along a direction shown by an arrow of a broken line and stops at a predetermined position (the previous position of the container 5e) on the filling station 5.

The control section of the carrier 7 makes the clamping mechanism 72 descend by the use of the hoist motor 71a. When the container 5e descends to the up-and-down platform 52a of the transport device 52, the load sensor mounted on the supporting rope 54r is turned "OFF." When the load sensor is turned "OFF," the control section stops the hoist motor. The control section drives the motor 72c to reversely rotate the screw shaft 72d and to make the arm portion 72f downwardly move as shown by an arrow of a broken line in FIG. 5. The downward movement of the arm portion 72f moves the pin units 72h and 72i to the left end and the right end of the guide holes 72g, respectively, and makes the hook portions 72j and 72k pivot in an opening direction (a direction shown by a dot-and-dash line) around the pin units 72l and 72m, respectively. In other words, the hook portions 72j and 72k are opened to release the container 5e. At this time, the contactless sensor 72m is turned "ON," so that the control section detects completion of releasing operation. Thereafter, the carrier 7 returns to the stand-by position and informs the controller 8 of completion of return operation.

Responsive to notification of completion of the return operation, the controller 8 delivers a resin material feeding command to the control unit 5g. Referring to FIG. 2, the control unit 5g drives the motor 51a in response to the resin material feeding command. The screw shaft 51b is thereby rotated to make the moving platform 52c move to a position right under the chute 53e. Then, the motor 51a is stopped. Next, the control unit 5g drives the up-and-down cylinder 52b to make the up-and-down platform 52a ascend. In other words, the container 5e is lifted. As shown in FIG. 3, this results in insertion of the chute 53e into the container 5e and in depression of the slidable plug unit 54l into the container housing 54a in a sliding manner against the energizing force of the coil spring 54k. For example, the plug unit is depressed to a position shown by a broken line and the upper open end is kept in an unpluged state. When the control unit 5g drives the motor 53f to open the rotary feeder 53d, the resin tank 5a feeds the resin material into the container 5e. After lapse of a predetermined time interval (a time duration enough to fill the resin material into the container 5e), the rotary feeder 53d is closed. After lowering the up-and-down platform 52a by the up-and-down cylinder 52b, the control unit 5g drives the motor 51a to reversely rotate the screw shaft 51b and return the moving platform 52c to the former position. The control unit 5g informs the controller 8 of completion of resin material filling operation.

Figure 5:
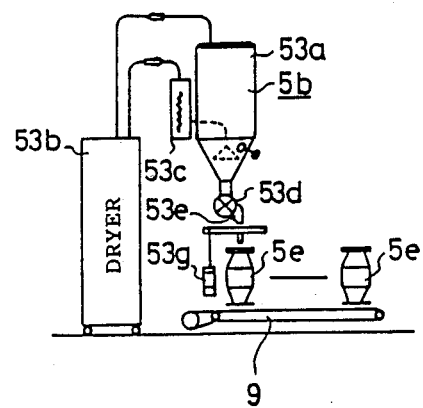
FIG. 5 is a view illustrative of another embodiment of the filling station.

In the above-mentioned embodiment, when the resin material is fed into the container at the filling station 5, the moving platform is moved to a position right under the chute by drive control of the motor and the container is lifted by the up-and-down cylinder so that the chute and the container are coupled. However, the container 5e may rest on a belt conveyer 9 as shown in FIG. 5. In this event, the container 5e is moved by the belt conveyer 9 and the chute 53e is lowered by a driving device 53g so that the chute 53e and the container 5e are coupled.

Figure 6:
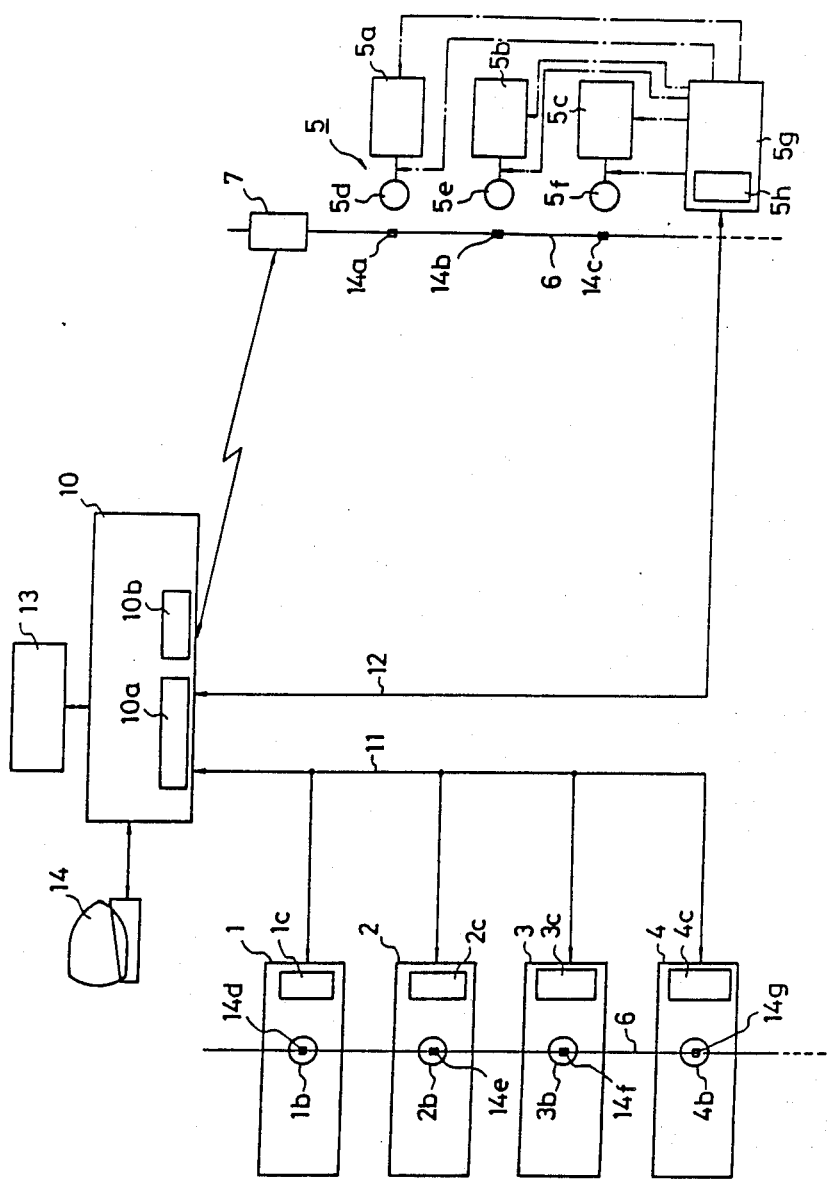
FIG. 6 is a view illustrative of another embodiment of the material automatic feeding system according to the present invention.

Next, description will proceed to another embodiment of the present invention with reference to FIG. 6.

In this embodiment, a central control unit 10 comprises a wired transmitting/receiving end 10a which is connected through cables 11 and 12 to the transmitting-/receiving ends 1c through 4c of the injection molding machines 1 through 4 and which is also connected to a transmitting/receiving end 5h of the resin material feeding control unit 5g, respectively. On the other hand, the carrier 7 receives a command through a radio transmitting/receiving end 10b from the central control unit 10 and returns a response through the radio transmitting-/receiving end 10b. In addition, the central control unit 10 is connected to a graphic display 13 and an input-/output terminal device 14. An operator inputs through the input/output terminal device 14 various commands and preselected values to be set in the central control unit 10. On the other hand, the graphic display 13 displays control conditions of the injection molding machines 1 through 4, the filling station 5, and the carrier 7. Furthermore, along the track 6 are disposed position sensors 14a, 14b, and 14c at positions corresponding to those of the containers 5d, 5e, and 5f, respectively, while position sensors 14d through 14g are disposed at positions corresponding to those of the hoppers 1b through 4b of the injection molding machines 1 through 4, respectively.

In this embodiment, the carrier 7 starts the movement on receiving, from the central control unit 10, together with a start signal, position information of the injection molding machine 2 to be fed with the resin material and position information of the container 5e which is filled with the resin material to be fed, namely, together with a start signal, position information given from the position sensor 14e corresponding to the injection molding machine 2 and position information given from the position sensor 14b corresponding to the container 5e (for example, the position sensor 14e provides the sixth one of the position information that is counted from the position sensor 14a and likewise the position sensor 14b provides the second one of the position information).

On detecting the "ON" condition of the position sensor 14b or on receiving the "ON" signal of each position sensor twice, the carrier 7 stops, clamps the container 5e, and starts the movement again, as described in the foregoing. On detecting the "ON" condition of the position sensor 14e or on receiving the "ON" signal of each position sensor six times, the carrier 7 again stops and feeds the resin material to the injection molding machine 2. Thereafter, return is made along the track 6, and is stopped in response to the tenth one of the "ON" signals that is counted from the first one. After sending back the container 5e to a predetermined position, return is made to the stand-by position.

In this embodiment, the injection molding machines 1 through 4 are collectively controlled by the central processing device 10. In other words, the central control unit 10 controls injection molding cycles of each injection molding machine 1 through 4, instead of controlling injection molding cycles of the injection molding machines 1 through 4 by the use of the control units of the individual injection molding machines, respectively, as illustrated in the first embodiment.

In a material automatic feeding system according to the present invention, a container filled with a resin material is transported to injection molding machines by a carrier. Accordingly, it is unnecessary to provide feeding pipes and to newly add any installation such as feeding pipes even if injection molding machines increase in number. Accordingly, there is an advantage that facilities in a factory are simplified.

I claim:

1. An injection molding system comprising:
   a plurality of injection molding machines;
   a resin storage unit for storing resin which is to be injected into said injection molding machines;
   a container that is selectively and mechanically detachable from said resin storage unit for containing said resin fed from said resin storage unit, said container being positioned adjacent to said resin storage unit when the container is located at a rest zone in which the container is at rest;
   a transportation track extending between said rest zone and said plurality of injection molding machines;
   a carrier associated with said transportation track for holding said container and for conveying said container along said transportation track between said rest zone and said plurality of injection molding machines; and
   control means electrically coupled to said container and said carrier for controlling said container and said carrier to selectively detach said container from said resin storage unit and to convey said carrier along said transportation track with said container held by said carrier.

2. An injection molding system as claimed in claim 1, wherein said container includes an inlet through which resin can be fed to fill the container, an outlet through which resin can be discharged from said container, and damper means for opening and closing said inlet and said outlet.

3. An injection molding system as claimed in claim 1, wherein said control means controls said carrier through a radio channel.

4. An injection molding system as claimed in claim 1, including a plurality of position sensors disposed along said transportation track to produce position signals specifying a position of the carrier and machine positions of said injection molding machines when said carrier reaches said position sensors, said carrier being controlled by said control means in response to said position signals.

5. An injection molding system as claimed in claim 1, wherein said injection molding machines are operable under selected injection molding conditions which form an injection molding cycle, wherein a selected injection molding condition is indicated by said control means.

6. An injection molding system as claimed in claim 5, wherein said control means controls each injection molding cycle of said plurality of injection molding machines.

7. An injection molding system as claimed in claim 1, wherein said transportation track is a monorail track.

8. An injection molding system comprising:
   a plurality of injection molding machines;
   a plurality of resin tanks for storing a plurality of resins which are to be injected into said injection molding machines;
   a plurality of containers that are selectively and mechanically detachable from said resin tanks for containing said resins fed from said resin tanks, said containers being positioned adjacent to said resin tanks when the containers are located at rest positions in which the containers are at rest;

a transportation track extending between said rest positions and said plurality of the injection molding machines;

a carrier associated with said transportation track for selectively holding each of said containers and for selectively conveying each of said containers along said transportation track between said rest positions and said plurality of injection molding machines; and control means electrically coupled to said plurality of containers and said carrier for controlling said containers and said carrier to selectively detach said containers from said resin tanks and to convey said carrier along said transportation track with one of said containers held by said carrier.

9. An injection molding system as claimed in claim 8, wherein said container includes an inlet through which resin can be fed to fill the container, an outlet through which resin can be discharged from said container, and damper means for opening and closing said inlet and said outlet.

10. An injection molding system as claimed in claim 8, wherein said control means controls said carrier through a radio channel.

11. An injection molding system as claimed in claim 10, including a plurality of position sensors disposed along said transportation track to produce position signals specifying a position of the carrier and machine positions of said injection molding machines when said carrier reaches said position sensors, said carrier being controlled by said control means in response to said position signals.

12. An injection molding system as claimed in claim 8, wherein said injection molding machines are operable under selected injection molding conditions which form an injection molding cycle, wherein a selected injection molding condition is indicated by said control means.

13. An injection molding system as claimed in claim 12, wherein said control means controls each injection molding cycle of said plurality of injection molding machines.

14. An injection molding system as claimed in claim 8, wherein said transportation track is a monorail track.

* * * * *